US012510023B1

(12) United States Patent
Chandler et al.

(10) Patent No.: US 12,510,023 B1
(45) Date of Patent: Dec. 30, 2025

(54) FAN CASE MOUNTED EVAPORATOR FOR AIRCRAFT TURBINE ENGINE

(71) Applicant: RTX CORPORATION, Farmington, CT (US)

(72) Inventors: Jesse M. Chandler, S. Windsor, CT (US); Gregory M. Chere, Glastonbury, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/760,255

(22) Filed: Jul. 1, 2024

(51) Int. Cl.
*F02C 3/30* (2006.01)
*F02C 7/141* (2006.01)
*F02C 3/22* (2006.01)

(52) U.S. Cl.
CPC ................ *F02C 3/30* (2013.01); *F02C 7/141* (2013.01); *F02C 3/22* (2013.01)

(58) Field of Classification Search
CPC ............... F02C 3/22; F02C 3/30; F02C 7/141
See application file for complete search history.

(56) References Cited

U.S. PATENT DOCUMENTS

| | | | | |
|---|---|---|---|---|
| 6,931,834 | B2 * | 8/2005 | Jones | H05K 7/20318 60/730 |
| 8,510,945 | B2 * | 8/2013 | Hand | F02K 3/115 60/730 |
| 9,109,464 | B2 * | 8/2015 | Suciu | F01D 25/125 |
| 9,677,474 | B2 * | 6/2017 | Hundley, Jr. | F02C 7/12 |
| 10,156,404 | B2 * | 12/2018 | Ueda | F28D 1/03 |
| 10,294,822 | B2 | 5/2019 | Caruel et al. | |
| 10,704,466 | B2 | 7/2020 | Dierksmeier | |
| 10,989,071 | B2 * | 4/2021 | Walsh | B64D 33/08 |
| 11,008,943 | B2 * | 5/2021 | Tajiri | F02K 3/105 |
| 11,313,276 | B2 * | 4/2022 | Emmanouil | F02C 7/14 |
| 12,092,022 | B2 * | 9/2024 | Sobanski | F02C 3/30 |
| 12,331,686 | B1 * | 6/2025 | Chandler | F02C 7/141 |
| 12,366,216 | B1 * | 7/2025 | Chandler | F02C 3/30 |
| 2023/0286661 | A1 * | 9/2023 | Klingels | F01N 3/0205 |
| 2024/0360784 | A1 * | 10/2024 | Sobanski | F02C 3/04 |

* cited by examiner

*Primary Examiner* — Lorne E Meade
(74) *Attorney, Agent, or Firm* — Carlson, Gaskey & Olds, P.C.

(57) ABSTRACT

An aircraft propulsion system includes an exhaust duct that defines a flow path for the exhaust gas flow to a condenser assembly, and an evaporator system where heat from the exhaust gas flow is used to transform water from the condenser assembly into a steam flow for injection into the core engine. The evaporator system includes at least one heat exchanger stage that is mounted to the fan case and is in communication with the exhaust gas flow routed through the exhaust duct.

20 Claims, 5 Drawing Sheets

FAN CASE MOUNTED EVAPORATOR FOR AIRCRAFT TURBINE ENGINE

TECHNICAL FIELD

The present disclosure relates generally to an evaporator arrangement for an aircraft propulsion system, and more particularly to an evaporator arrangement that accommodates a smaller propulsion system.

BACKGROUND

An aircraft propulsion system typically includes a gas turbine engine with a fan section, a compressor section, a combustor section, and a turbine section. Air entering the compressor section is compressed and delivered into the combustion section where it is mixed with fuel and ignited to generate a high-energy exhaust gas flow. Some energy in the high energy exhaust flow is recovered as it is expanded through a turbine section. A large amount of energy is lost in the form of heat that is simply exhausted from the turbine section to the atmosphere. Steam injection can provide improved propulsive efficiencies. Water recovered from the exhaust gas flow may be transformed into steam using thermal energy from the exhaust gas flow in an evaporator. Thermal communication between the exhaust gas flow and recovered water may require relatively large heat exchangers that present challenges for incorporation into engine configurations.

SUMMARY

An aircraft propulsion system according to an exemplary embodiment of this disclosure, among other possible things includes a core engine that includes a compressor, combustor, and turbine section, an inlet airflow is compressed and communicated to the combustor, mixed with fuel, and ignited to generate an exhaust gas flow that is expanded through the turbine section, a fan that is driven about a propulsor axis by the core engine, a nacelle assembly, a fan case that is disposed within the nacelle assembly that at least partially surrounds the fan, a condenser assembly where water is condensed from the exhaust gas flow that is generated by the core engine, an exhaust duct that defines a flow path for the exhaust gas flow to the condenser assembly, and an evaporator system where heat from the exhaust gas flow is used to transform water from the condenser assembly into a steam flow for injection into the core engine. The evaporator system includes at least one heat exchanger stage that is mounted to the fan case and is in communication with the exhaust gas flow routed through the exhaust duct.

In a further embodiment of the foregoing aircraft propulsion system, the exhaust duct further includes a center portion that communicates exhaust gas flow into at least one bifurcation that extends radially from the center portion to the heat exchanger stage mounted on the fan case.

In a further embodiment of any of the foregoing aircraft propulsion systems, the exhaust duct further includes an outer axial portion that extends axially forward from the bifurcation to the at least one heat exchanger stage.

In a further embodiment of any of the foregoing aircraft propulsion systems, the at least one heat exchanger stage includes a first stage and a second stage.

In a further embodiment of any of the foregoing aircraft propulsion systems, the first stage is downstream from the second stage relative to the exhaust gas flow from the core engine.

In a further embodiment of any of the foregoing aircraft propulsion systems, the second stage includes a superheater where a steam flow is heated by the exhaust gas flow.

In a further embodiment of any of the foregoing aircraft propulsion systems, the condenser assembly includes a plurality of condensers arranged in the nacelle.

In a further embodiment of any of the foregoing, the aircraft propulsion system includes a cooling air duct assembly where a portion of inlet airflow is communicated to each of the plurality of condensers.

In a further embodiment of any of the foregoing, the aircraft propulsion system further includes a plurality of water separators where water from the condenser assembly is separated from the exhaust gas flow.

In a further embodiment of any of the foregoing aircraft propulsion systems, the turbine section of the core engine is engine forward of the combustor and the compressor section and an inlet duct assembly communicates a portion of the inlet airflow to an inlet that is disposed aft of the compressor section.

In a further embodiment of any of the foregoing, the aircraft propulsion system further includes a power turbine that is coupled to drive the propulsor. The power turbine is disposed engine forward of the core engine.

In a further embodiment of any of the foregoing, the aircraft propulsion system further includes an intercooling system.

A steam generation system for an aircraft propulsion system according to another exemplary embodiment of this disclosure, among other possible things includes a condenser assembly where water is condensed from the exhaust gas flow that is generated by a core engine, an exhaust duct that defines a flow path for the exhaust gas flow to the condenser assembly, and an evaporator system where heat from the exhaust gas flow is used to transform water from the condenser assembly into a steam flow for injection into the core engine. The evaporator system includes at least one heat exchanger stage that is configured for mounting to a fan case of an aircraft propulsion system and in communication with an exhaust gas flow that is routed through the exhaust duct.

In a further embodiment of the foregoing steam generation systems, the exhaust duct further includes a center portion that communicates exhaust gas flow into at least one bifurcation that extends radially from the center portion to the heat exchanger stage mounted on the fan case.

In a further embodiment of any of the foregoing steam generation systems, the exhaust duct further includes an outer axial portion that extends axially forward from the bifurcation to the at least one heat exchanger stage.

In a further embodiment of any of the foregoing steam generation systems, the at least one heat exchanger stage includes a first stage and a second stage, and the first stage is downstream from the second stage relative to the exhaust gas flow from the core engine.

In a further embodiment of any of the foregoing steam generation systems, the condenser assembly includes a plurality of condensers that are arranged in a nacelle and a corresponding plurality of water separators where water from the condenser assembly is separated from the exhaust gas flow.

A method of operating an aircraft propulsion system according to another exemplary embodiment of this disclosure, among other possible things includes generating an exhaust gas flow with a core engine that includes a compressor, combustor, and turbine section, coupling a propulsor to a power turbine that is configured to be driven by expansion of the exhaust gas flow about a propulsor axis by the core engine, condensing water in condenser assembly, heating water from the condenser assembly in an evaporator system with at least one heat exchanger stage that is mounted to a fan case that at least partially surrounds a fan that is coupled to the core engine, and communicating the generated steam flow to the core engine.

In a further embodiment of the foregoing method, the at least one heat exchanger stage includes a first stage and a second stage each mounted to the fan case. The first stage and second stage separately communicate thermal energy into a water flow to generate the steam flow.

In a further embodiment of any of the foregoing, the method further includes arranging a plurality of condensers of the condenser assembly within a nacelle that surrounds the core engine and a portion of the fan case.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
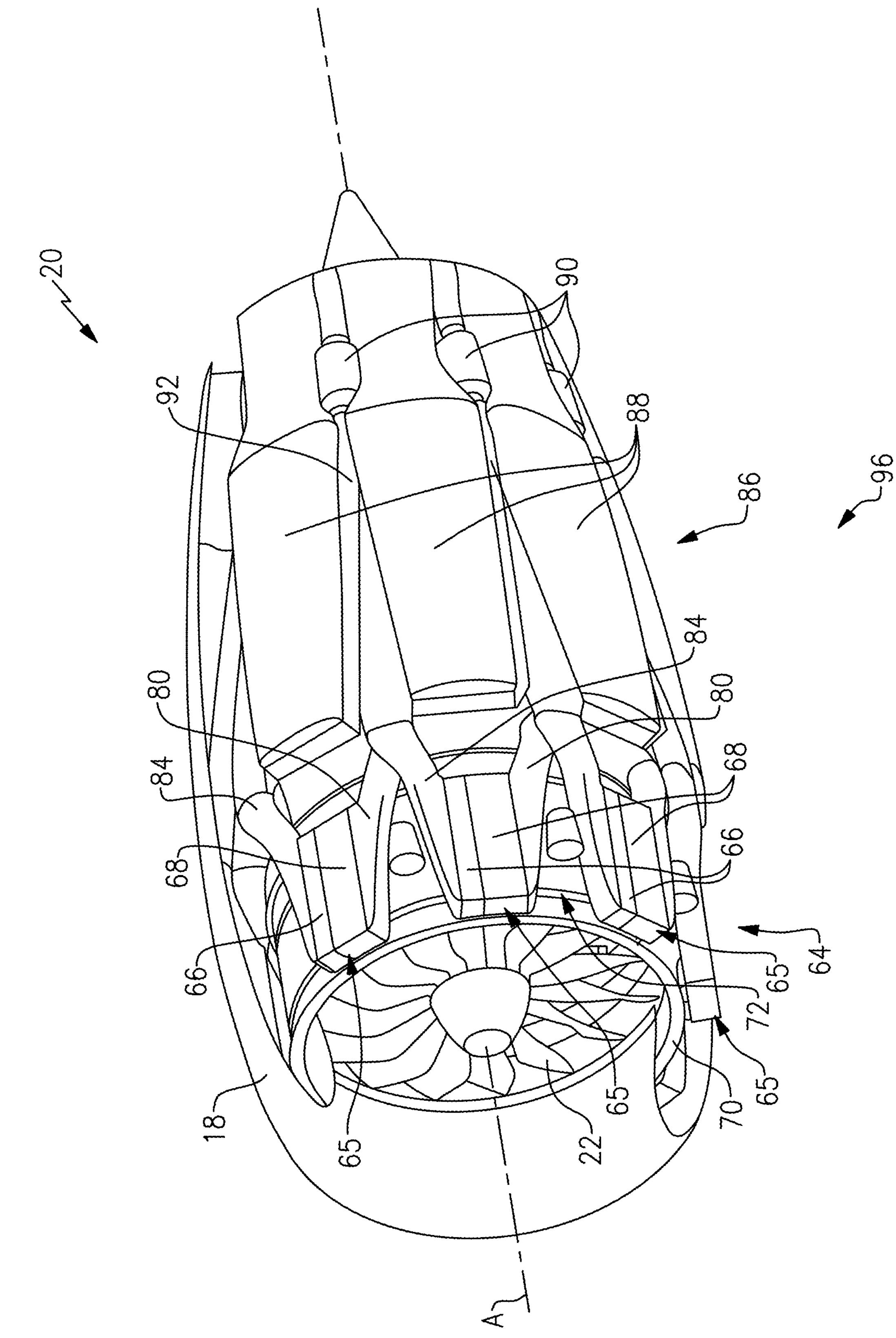
FIG. 1 is a schematic view of an example aircraft propulsion system with a steam generation system.
Figure 2:
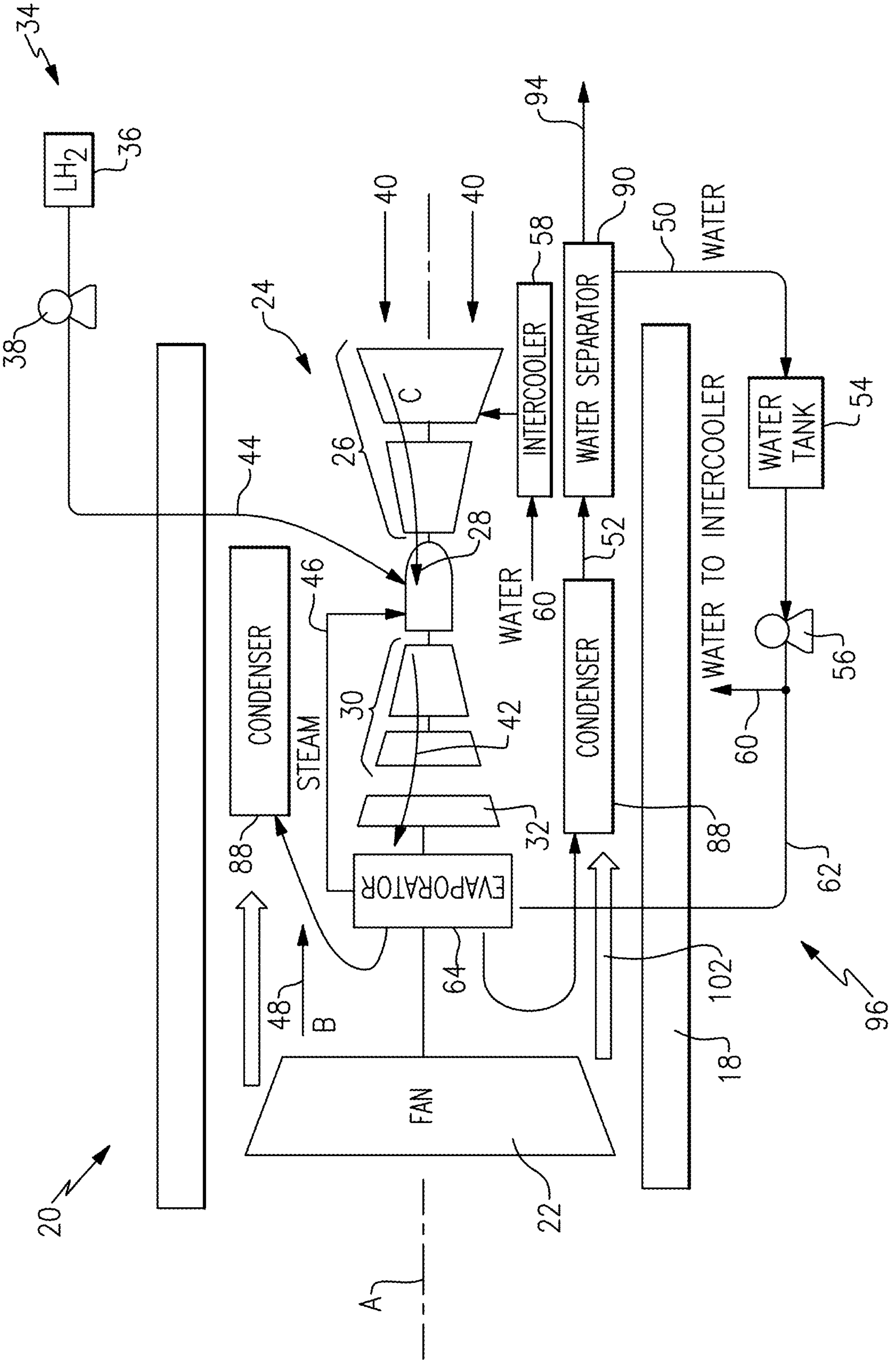
FIG. 2 is a simplified schematic view of the example aircraft propulsion system of FIG. 1.

FIGS. 1 and 2 schematically illustrate an aircraft propulsion system 20 with a steam generation system 96 that generates a steam flow 46 with water recovered from an exhaust gas flow 42. The steam generation system 96 includes a condenser assembly 86, an evaporator system 64 and an exhaust duct assembly 74. The evaporator system 64 includes stages mounted to an outer surface 72 of a fan case 70 circumscribing a propulsive fan 22. Location of stages of the evaporator system 64 on the fan case 72 provides for a simplified overall propulsion system architecture.

The evaporator system 64 and the condenser assembly 86 include heat exchangers that are configured to transfer thermal energy. In the evaporator system 64, thermal energy from the exhaust gas flow 42 is utilized to vaporize water and generate a steam flow 46. In the condenser assembly 86, a cooling air flow is utilized to cool and condense liquid from the exhaust gas flow 42. Evaporation and condensing functions may require large areas of thermal communication. The disclosed evaporator system 64 and condenser assembly 86 provides the large areas for thermal communication in the limited space available within the example propulsion system 20.

Referring to FIG. 2, with continued reference to FIG. 1, the example propulsion system 20 includes a propulsive fan 22 and a reverse core engine 24. The example core engine 24 includes a compressor section 26, a combustor section 28 and the turbine section 30 disposed along the longitudinal axis A. The turbine section 30 is disposed engine forward of the combustor 28 and the compressor section 26. A power turbine 32 is arranged forward of the turbine section 30 and drives the fan 22. The power turbine 32 is coupled to the drive the fan 22 and is rotatable independent of structures in the core engine 24. The power turbine 32 is not mechanically coupled to the core engine 24.

The fan 22 drives the bypass airflow 48 along a bypass flow path B, while the compressor section 26 draws an inlet flow 40 into a core flow path C of the core engine 24. The fan 22 and core engine 24 are disposed within a nacelle 18. The inlet flow 40 is compressed and communicated to the combustor section 28 where the compressed inlet flow 40 is mixed with a fuel flow 44 and ignited to generate the exhaust gas flow 42. The exhaust gas flow 42 expands through the turbine section 30 where energy is extracted and utilized to drive the compressor section 26. The exhaust gas flow 42 further expands through the power turbine 32 to drive the fan 22.

In addition to the fuel 44, a steam flow 46 is introduced into the combustor 28. The steam flow 46 may be injected at the combustor 28 or a location upstream of the combustor for communication into the combustor 28. Performance is improved with the injection of the steam flow because the steam flow 46 increases mass flow through the turbine section 30 without additional work required by the compressor section 26.

The steam flow 46 is generated by heating water 50 recovered from the exhaust gas flow 42 in the condenser 88. A cooling flow 102 cools the exhaust gas flow 42 within the condenser 88 to condense water. A mixed water and gas flow 52 are sent through a water separator 90 such that water 50 is communicated to a water tank 54 and a gas flow 94 exhausted. A pump 56 generates pressurized water flow 62 that is heated in the evaporator system 64 with heat from the exhaust gas flow 42. The steam flow 46 from the evaporator system 64 is injected into the combustor 28.

A fuel system 34 includes at least a fuel tank 36 and a fuel pump 38 to provide the fuel flow 44 to the combustor 28. The example fuel system 34 is configured to provide a hydrogen based fuel such as a liquid hydrogen ($LH_2$). Although hydrogen is disclosed by way of example, other non-carbon based fuels could be utilized and are within the contemplation of this disclosure. Moreover, the disclosed features may also be beneficial in an engine configured to operate with traditional carbon fuels and/or biofuels, such as sustainable aviation fuel.

The example propulsion system 20 may further include an intercooler 58 for injecting an intercooling water flow 60 into the compressor section 26 to reduce a temperature of the inlet airflow 40 and increase mass flow. Reduced temperatures and increased mass flow provided by injection of water increases compressor efficiency.

Although an example engine architecture is disclosed by way of example, other turbine engine architectures are within the contemplation and scope of this disclosure. Moreover, although the disclosed non-limiting embodiment depicts a turbofan turbine engine, it should be understood that the concepts described herein are not limited to use with turbofans as the teachings may be applied to other types of turbine engines. For example, the core engine 24 may be offset from the engine axis A. Additionally, the features of this disclosure may be applied to other engine configurations utilized to generate shaft power.

Figure 3:
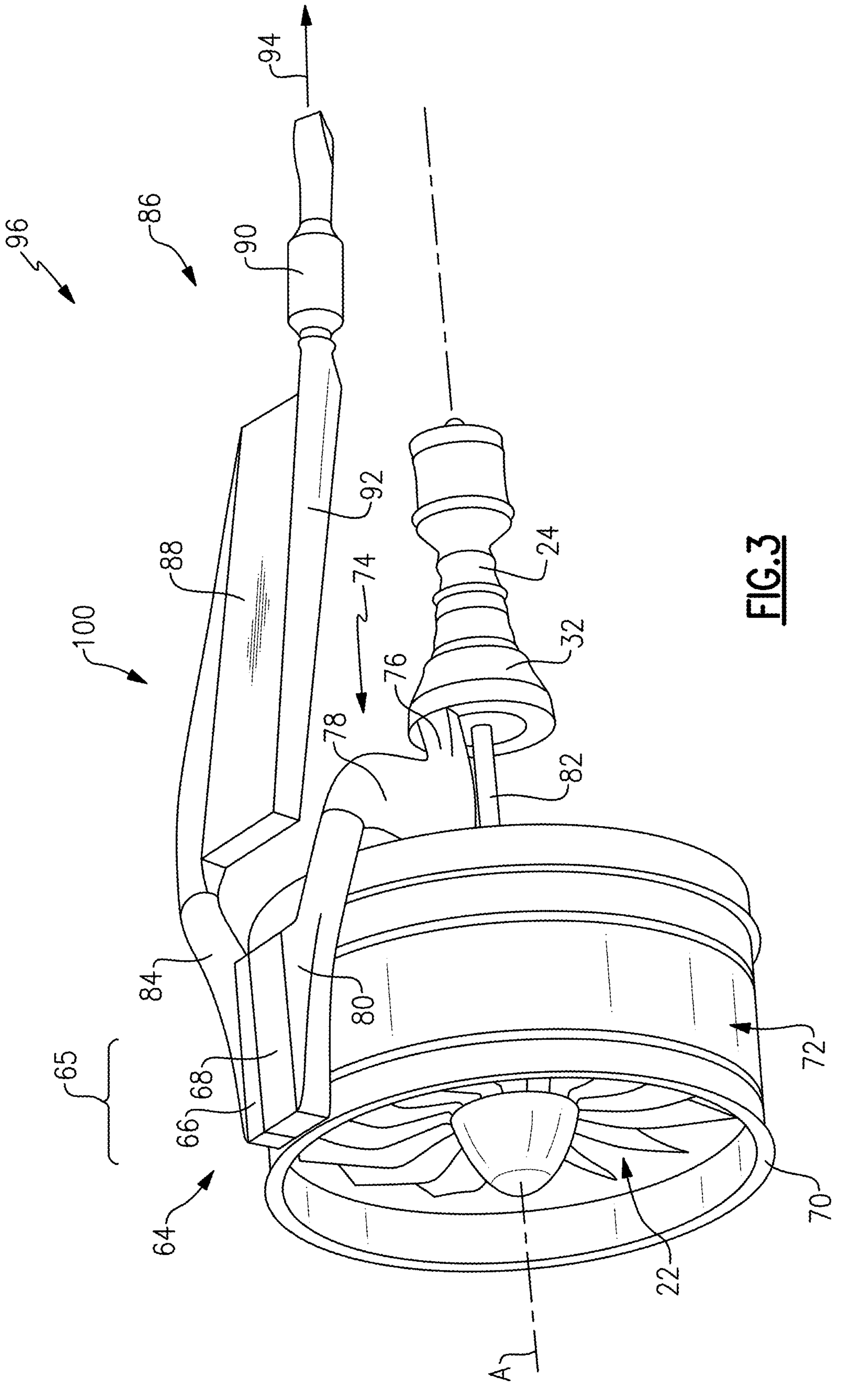
FIG. 3 is a schematic view of the example aircraft propulsion system and steam generation system.

Referring to FIG. 3, with continued reference to FIGS. 1 and 2, the power turbine 32 drives the fan 22 through a drive shaft 82. The fan 22 is circumscribed by the fan case 70. A plurality of heat exchanger sets 65 are disposed about the fan case 70. Each of the plurality of heat exchanger sets 65 include a first stage 66 and a second stage 68 mounted to the outer surface 72 of the fan case 70.

Mounting of the heat exchanger sets 65 on the fan case 70 provides for the core engine 24 to be closer to the fan 22 and thereby for the use of shorter drive shaft 82. The exhaust gas flow 42 is fed to the first and second stages 66, 68 through the exhaust duct assembly 74. Although the example evaporator system 64 is disclosed as including sets 65 with the first stage 66 and the second stage 68, a plurality of single stage heat exchangers could be utilized and is within the contemplation and scope of this disclosure. Moreover, although two stages are shown and described by way of example, the heat exchanger sets 65 may includes multiple stages and remain with the contemplation and scope of this disclosure.

The exhaust duct assembly 74 includes a center portion 76 disposed radially outward from the drive shaft 82 forward of the power turbine 32. Exhaust gas flow 42 from the power turbine 32 is received within the center portion 76 that is engine forward of the core engine 24 and power turbine 32. The center portion 76 directs exhaust gas flow 42 radially outward through a bifurcation 78. The bifurcation 78 communicates the exhaust gas flow 42 through the bypass flow path B aft of the fan 22. From the bifurcation 78, the exhaust gas flow 42 is routed axially forward through axial portion 80. The axial portion 80 extends axially forward on the outer surface 72 of the fan case 70. The exhaust gas flow 42 is turned circumferentially through the second stage 68 and the first stage 66.

The first stage 66 receives the exhaust gas flow 42 after flowing through the second stage 68. Accordingly, the exhaust gas flow 42 is hotter within the second stage 68. In one disclosed example, the second stage 68 is a superheater and is utilized for reheating or further heating a vapor or water flow from the first stage 66. Moreover, although two stages are shown, a single stage may be utilized and is within the contemplation and scope of this disclosure.

An inlet manifold 84 directs gas flow to a condenser 88 of the condenser assembly 86. In the condenser 88, the exhaust gas flow 42 is cooled to condense water and communicated through an outlet manifold 92 to a water separator 90. The water separator 90 separates water from the gas flow. Water 50 is communicated to the water tank 54 (FIG. 2) and the remaining gas flow 94 is exhausted away from the propulsion system 20.

FIG. 3 illustrates a single leg 100 of the steam generation system 96 that defines a flow path for the exhaust gas flow 42 from the power turbine 32 to the water separator 90. A plurality of legs 100 are arranged about the engine axis A and route the exhaust gas flow 42 to one set of the first and second stages 66, 68 of the evaporator system 64.

Figure 4:
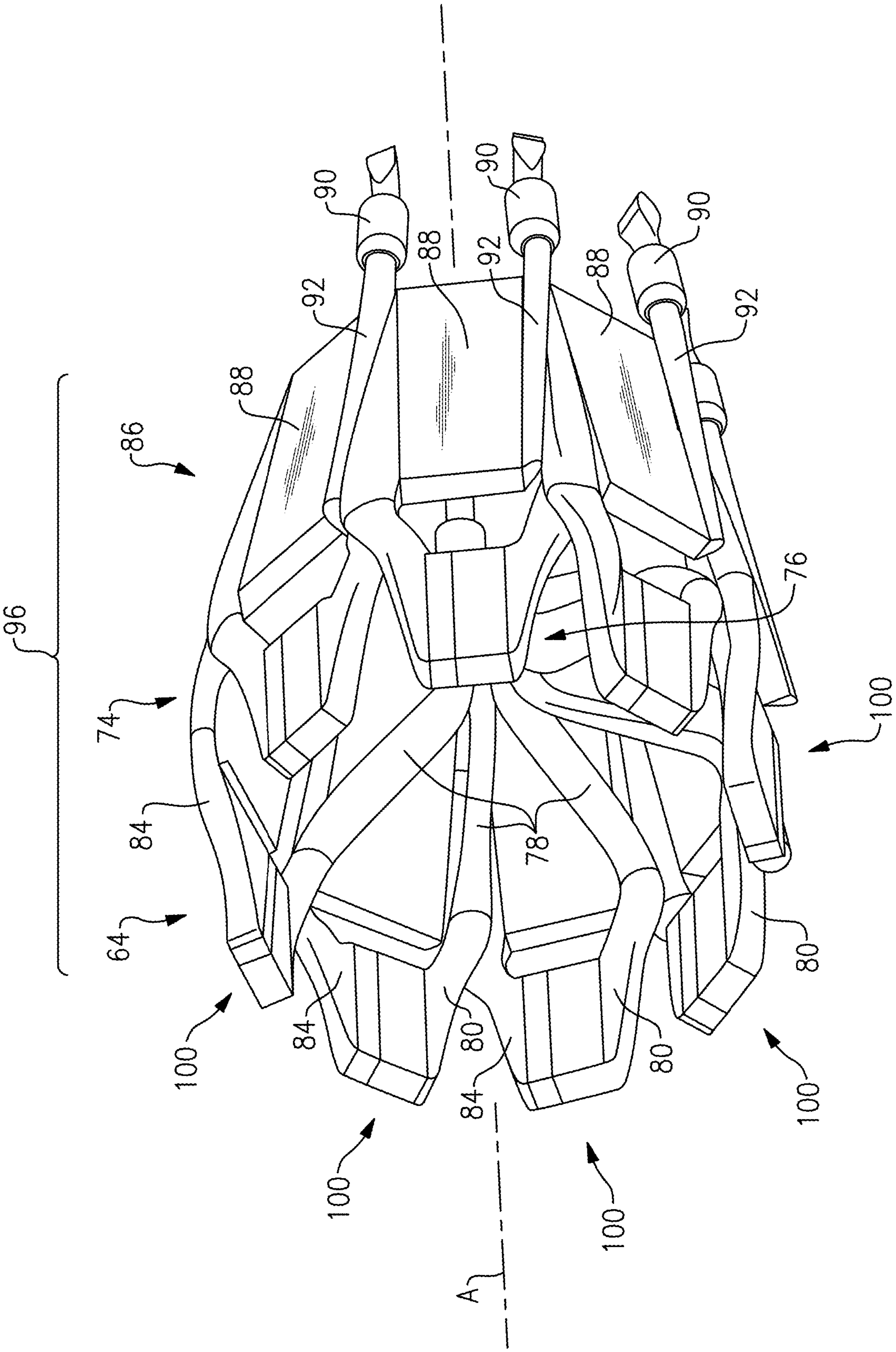
FIG. 4 is a perspective view of the example steam generation system.

Referring to FIG. 4, the steam generation system 96 is shown with the plurality of legs 100 arranged around the engine axis A. The exhaust duct assembly 74 includes a plurality of center portions 76, bifurcations 78 and axial portions 80 arranged about the engine Axis A. Each of the legs 100 corresponds with one set 65 of the plurality of first and second stages 66, 68 of the evaporator system 64. Moreover, a single condenser 88 and a single water separator 90 are provided in each of the legs 100 in the disclosed example. Although the steam generation system 96 is shown and described by way of example as including individual legs 100, more than one set 65 of heat exchangers and condensers 88 may be combined to receive exhaust gas flow through a common exhaust duct passageway of the exhaust duct assembly 74. Moreover, the set of heat exchangers may be arranged symmetrically or asymmetrically about the engine axis A to conform to the specific engine configuration.

Figure 5:
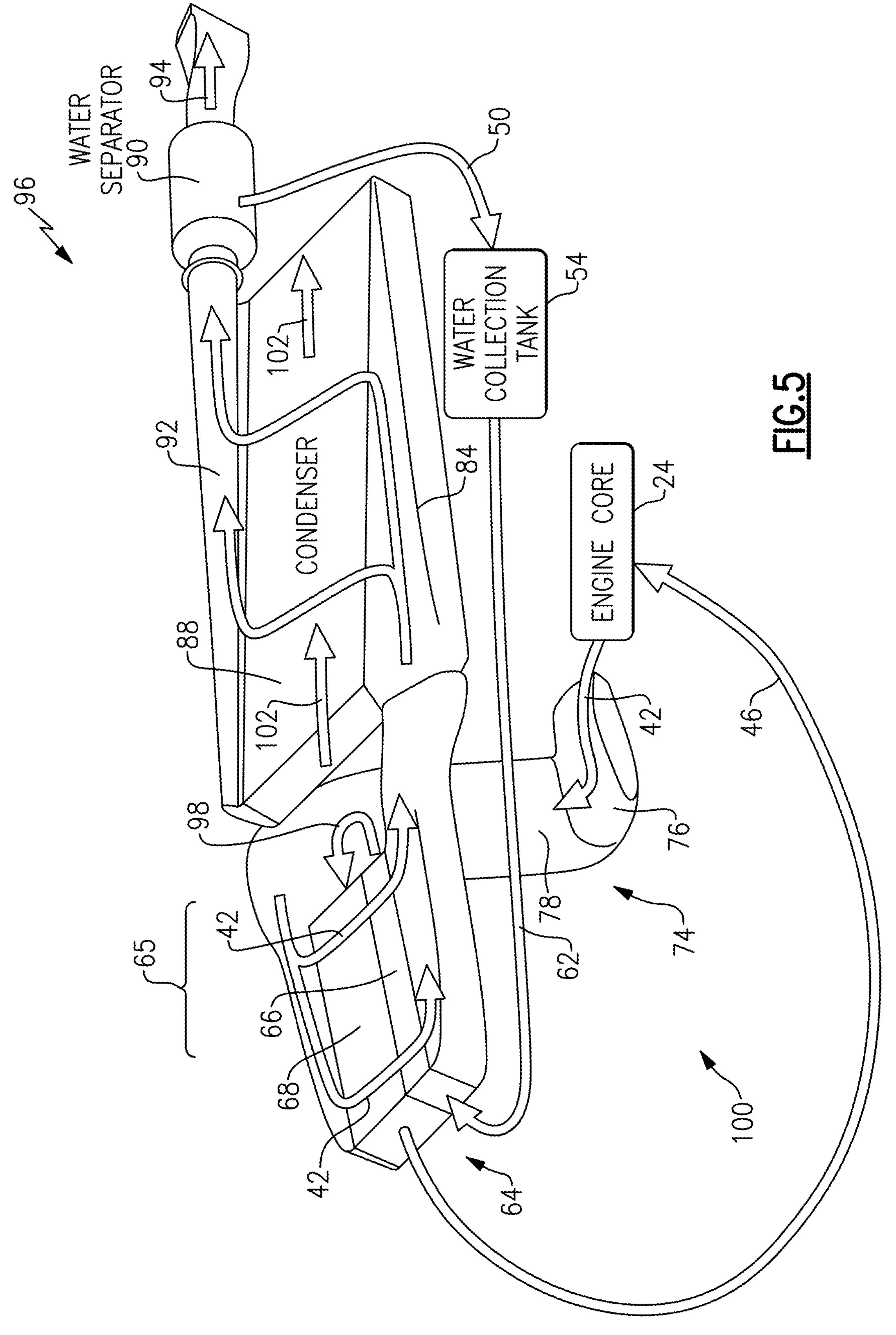
FIG. 5 is another schematic view of the example steam generation system.

Referring to FIG. 5, operation of the example steam generation system 96 is schematically shown and begins with the generation of the exhaust gas flow 42 in the core engine 24. The exhaust gas flow is communicated through the exhaust duct assembly 74 and into the second stage 68 and then into the first stage 66. In the first stage 66, a flow of pressurized water 62 is heated to generate a steam flow 98. The steam flow 98 is then further heated in the second stage 68. In this example embodiment, the second stage 68 is a superheater for further heating the steam flow 98 generated in the first stage 66. The steam flow 46 from the second stage 68 is injected into the core engine 24 to improve power production.

A cooling flow 102 is in thermal contact with the condenser 88. The cooling flow 102 may be a portion of the bypass flow 48. Other sources of cooling flows may be used to cool the exhaust gas flow 42 within the condenser 88 and condense water. Water 50 is separated from a gas flow 94 exiting the water separator 90. The water 50 is sent to a tank 54 and subsequently communicated through the evaporator system 64 for generation of the steam flow 46.

Accordingly, the example steam generation system 96 includes features for arranging heat exchangers of the evaporator system 64 about the fan case 70 to provide for the arrangement of large area heat exchanger within a compact aircraft propulsion system 20.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. An aircraft propulsion system comprising:

a core engine comprising a compressor, combustor, and turbine section, wherein an inlet airflow is compressed and communicated to the combustor, mixed with fuel, and ignited to generate an exhaust gas flow that is expanded through the turbine section;

a fan driven about a propulsor axis by the core engine;

a nacelle assembly;

a fan case disposed within the nacelle assembly at least partially surrounding the fan;

a condenser assembly where water is condensed from the exhaust gas flow generated by the core engine;

an exhaust duct defining a flow path for the exhaust gas flow to the condenser assembly; and an evaporator system where heat from the exhaust gas flow is used to transform water from the condenser assembly into a steam flow for injection into the core engine, the evaporator system including at least one heat exchanger stage mounted to an outer surface of the fan case and in communication with the exhaust gas flow routed through the exhaust duct.

2. The aircraft propulsion system as recited in claim 1, wherein the exhaust duct further comprises a center portion that communicates exhaust gas flow into at least one bifurcation that extends radially from the center portion to the heat exchanger stage mounted on the fan case.

3. The aircraft propulsion system as recited in claim 2, wherein the exhaust duct further comprises an outer axial portion extending axially forward from the bifurcation to the at least one heat exchanger stage.

4. The aircraft propulsion system as recited in claim 1, wherein the at least one heat exchanger stage comprises a first stage and a second stage.

5. The aircraft propulsion system as recited in claim 4, wherein the first stage is downstream from the second stage relative to the exhaust gas flow from the core engine.

6. The aircraft propulsion system as recited in claim 4, wherein the second stage comprises a superheater where a steam flow is heated by the exhaust gas flow.

7. The aircraft propulsion system as recited in claim 1, wherein the condenser assembly comprises a plurality of condensers arranged in the nacelle.

8. The aircraft propulsion system as recited in claim 7, including a cooling air duct assembly where a portion of inlet airflow is communicated to each of the plurality of condensers.

9. The aircraft propulsion system as recited in claim 8, further comprising a plurality of water separators where water from the condenser assembly is separated from the exhaust gas flow.

10. The aircraft propulsion system as recited in claim 1, wherein the turbine section of the core engine is engine forward of the combustor and the compressor section and an inlet duct assembly communicates a portion of the inlet airflow to an inlet that is disposed aft of the compressor section.

11. The aircraft propulsion system as recited in claim 10, further comprising a power turbine coupled to drive the propulsor, the power turbine disposed engine forward of the core engine.

12. The aircraft propulsion system as recited in claim 10, further comprising an intercooling system.

13. A steam generation system for an aircraft propulsion system comprising:

a condenser assembly where water is condensed from the exhaust gas flow generated by a core engine;

an exhaust duct defining a flow path for the exhaust gas flow to the condenser assembly; and an evaporator system where heat from the exhaust gas flow is used to transform water from the condenser assembly into a steam flow for injection into the core engine, the evaporator system including at least one heat exchanger stage mounted to an outer surface of a fan case of an aircraft propulsion system and in communication with an exhaust gas flow routed through the exhaust duct.

14. The steam generation system in claim 13, wherein the exhaust duct further comprises a center portion that communicates exhaust gas flow into at least one bifurcation that extends radially from the center portion to the heat exchanger stage mounted on the fan case.

15. The steam generation system as recited in claim 14, wherein the exhaust duct further comprises an outer axial portion extending axially forward from the bifurcation to the at least one heat exchanger stage.

16. The steam generation system as recited in claim 15, wherein the at least one heat exchanger stage comprises a first stage and a second stage, and the first stage is downstream from the second stage relative to the exhaust gas flow from the core engine.

17. The steam generation system as recited in claim 16, wherein the condenser assembly comprises a plurality of condensers arranged in a nacelle and a corresponding plurality of water separators where water from the condenser assembly is separated from the exhaust gas flow.

18. A method of operating an aircraft propulsion system comprising:

generating an exhaust gas flow with a core engine including a compressor, combustor, and turbine section;

coupling a propulsor to a power turbine configured to be driven by expansion of the exhaust gas flow about a propulsor axis by the core engine;

condensing water in condenser assembly;

heating water from the condenser assembly in an evaporator system with at least one heat exchanger stage mounted to an outer surface of a fan case at least partially surrounding a fan coupled to the core engine; and communicating the generated steam flow to the core engine.

19. The method as recited in claim 18, wherein the at least one heat exchanger stage comprises a first stage and a second stage each mounted to the fan case, wherein the first stage and second stage separately communicate thermal energy into a water flow to generate the steam flow.

20. The method as recited in claim 18, further comprising arranging a plurality of condensers of the condenser assembly within a nacelle surrounding the core engine and a portion of the fan case.

* * * * *